UNITED STATES PATENT OFFICE.

WILLIAM WHEELER HUBBELL, OF PHILADELPHIA, PENNSYLVANIA.

IMPROVEMENT IN PAVEMENTS.

Specification forming part of Letters Patent No. 158,415, dated January 5, 1875; reissue No. 6,826, dated December 28, 1875; application filed October 27, 1875.

*To all whom it may concern:*

Be it known that I, WILLIAM WHEELER HUBBELL, of the city of Philadelphia, and State of Pennsylvania, have invented a new and useful Improvement in Street-Pavement, of which the following is a specification:

My present invention is an improvement upon the street-pavement for which Letters Patent No. 115,475, dated May 30, 1871, were granted to me; and the nature of this invention consists in the composition or combination of materials used in the formation of the upper body or wearing-surface of the street-pavement and the relative arrangement of the same to the broken stone constituting the foundation or lower portion of the pavement, this upper body or wearing-surface consisting of hydraulic cement and lime, with coal-ashes or sand, fine stone, or gravel, or either, mixed with hot tar or bitumen in a fluid condition, to saturate and unite or combine with the particles of the same, the fine or coarse foundation-stone being underneath, thus forming a most effectively-hardened concrete wearing-surfaced pavement.

A drawing to illustrate this invention or improvement would be the same in appearance as that annexed to my said patent, and therefore I refer to the said drawing as illustrating the nature of the pavement on which this improvement is made, and the specification of said patent describing the same.

The pavement substantially consists of coarse and small broken stone laid upon gravel or earth for a foundation, and bound together by cement, lime, and coal-ashes or sand, or fine stone or gravel, between the interstices of the stone, binding them together, and forming a wearing-surface immediately above the surface of the broken stone. This cement is composed, chiefly, of Rosendale or hydraulic cement, and, to harden it most effectively, is saturated with a solution of lime, though the lime, which is of itself one kind of cement, and best, may be omitted; but the hydraulic cement should, in all cases, be used to form the wearing-surface.

There are various brands of hydraulic cement, and I do not confine my invention to any one exclusively. The Rosendale or other suitable and economical cement should be used.

When the cement has been spread and well set, I slush, mix, or saturate it with thin hot bitumen or pitch, and dust the surface of bitumen over with dry cement, and roll and sweep it on the surface to adhere to the bitumen, and thus more effectively hold the particles of the cement together, and prevent them, as far as practicable, from forming dust.

The cements may, if desired, be mixed into and with the hot bitumen before the same is spread, and thus unite the cements and bitumen on the principle of my invention.

I am well aware that bitumen has been used with gravel to form a composition for pavements, and cement mixed together and laid in a layer, in which combination and process the bitumen predominates, and softens in hot weather; but this does not present the hardening principle of the cements when first set in the pavement, or mixed and afterward saturated or mixed with hot bitumen or tar by absorption, as in my combination and process, using the lime, cement, sand, and bitumen.

My object in this invention is to combine the adhesive and hardening principle of the bitumen with the hardening principle of the hydraulic cement and lime, to prevent the cements from forming or wearing into dust as much as possible; and also, while using the bitumen, its quantity is so small in the cement as not to soften by the heat of summer, as the bitumen pavements now do.

I do not claim combining or mixing broken stone, gravel, boiling tar, and hydraulic cement to lay and form a composition for a pavement, in which mixture the bitumen predominates and softens; but

I claim as my invention—

The street-paving composition consisting of hydraulic cement and lime, with coal-ashes or sand, fine stone or gravel, or either, and tar or bitumen, with fine and coarse stone underneath, forming the most effectively-hardened concrete wearing-surfaced pavement, substantially as described.

WM. WHEELER HUBBELL.

Witnesses:

E. HAWKINS,

THOMAS C. CONNOLLY.